United States Patent
Vargas et al.

(10) Patent No.: US 7,996,046 B2
(45) Date of Patent: Aug. 9, 2011

(54) SMART ALERT CHARMS FOR WIRELESS DEVICES

(75) Inventors: Sandra Irene Vargas, Sammamish, WA (US); Keith Rowe, Seattle, WA (US); Peter Bernard, Bellevue, WA (US); Peter Chin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 695 days.

(21) Appl. No.: 11/972,545

(22) Filed: Jan. 10, 2008

(65) Prior Publication Data

US 2009/0181726 A1     Jul. 16, 2009

(51) Int. Cl.
*H04B 1/38* (2006.01)
*H04M 1/00* (2006.01)

(52) U.S. Cl. ............... 455/567; 455/557; 455/550.1; 455/575.6

(58) Field of Classification Search .......... 455/414.2, 455/414.4, 418–421, 423–425, 426.1, 556.2, 455/557–558, 566–567, 575.2, 575.6, 3.06, 455/41.2–41.3, 61.1, 412.2, 413, 461, 466, 455/517, 550.1, 556.1; 379/88.11–88.13, 379/100.06, 164, 179, 373.01–373.05, 374.01–374.03, 379/375.01, 376.01, 420.04, 428.04, 430; 340/7.49–7.62, 539.13, 540, 571, 573.1, 340/573.4; 719/318
See application file for complete search history.

(56) References Cited

U.S. PATENT DOCUMENTS

| | | | |
|---|---|---|---|
| 5,722,071 A | 2/1998 | Berg et al. | |
| 6,993,363 B1 | 1/2006 | Hsu | |
| 7,133,700 B2 | 11/2006 | Benco et al. | |
| 7,203,524 B2 | 4/2007 | Tushinsky et al. | |
| 7,474,889 B2 * | 1/2009 | Bhakta et al. | 455/412.2 |
| 2003/0153366 A1 * | 8/2003 | Nagata | 455/567 |
| 2004/0052341 A1 | 3/2004 | Yeh et al. | |
| 2004/0204149 A1 * | 10/2004 | Kaneda et al. | 455/567 |
| 2005/0014534 A1 | 1/2005 | Hareng et al. | |
| 2005/0054290 A1 * | 3/2005 | Logan et al. | 455/41.2 |
| 2005/0066218 A1 * | 3/2005 | Stachura et al. | 714/3 |
| 2005/0266891 A1 | 12/2005 | Mullen | |
| 2006/0036695 A1 * | 2/2006 | Rolnik | 709/206 |
| 2006/0248183 A1 * | 11/2006 | Barton | 709/224 |
| 2007/0129113 A1 | 6/2007 | Klicpera et al. | |
| 2007/0293275 A1 * | 12/2007 | Kalinichenko et al. | 455/567 |
| 2008/0268780 A1 * | 10/2008 | Werner et al. | 455/41.2 |
| 2009/0106382 A1 * | 4/2009 | Arellano et al. | 709/206 |

FOREIGN PATENT DOCUMENTS

GB          2391746 A       2/2004

OTHER PUBLICATIONS

Kenneth P. Fishkin, Wireless User Interface Components for Personal Area Networks, IEEE Pervasive Computing, Oct. 2002, pp. 49-55, vol. 1, Issue 4, IEEE Educational Activities Department, Piscataway, NJ, USA.
Crave, Online gadget blog, http://asia.cnet.com/crave/2007/07/page/5/.
Tan Kit Hoong, Tech Central, The Star Online, http://star-techcentral.com/reviews/story.asp?file=/2007/8/23/prodit/20070822164215&sec=reviews&new=1&cat=7&rid=1073.

* cited by examiner

*Primary Examiner* — Meless N Zewdu
(74) *Attorney, Agent, or Firm* — Vierro Magen Marcus & DeNiro LLP

(57) ABSTRACT

A notification charm for a wireless communication device and a method of operating the wireless device to provide an alert on the charm are presented. The charm may be a bracelet, watch, keychain, ring, or other ornamental device which can generate event and preference based alerts about events occurring on a wireless device.

17 Claims, 8 Drawing Sheets

SMART ALERT CHARMS FOR WIRELESS DEVICES

BACKGROUND

Wireless devices have become an increasingly preferred way of keeping in touch. Many such devices include advanced capabilities beyond merely voice communications. Such capabilities include personal information management in the form of address books and calendars, text and video messaging, GPS directional services and other advanced features.

When an event such as receiving a phone call occurs on the device, the device attempts to alert it's operator, usually through a ringtone or a vibration alert from the device itself. However, often such alerts are missed because device users carry their devices in purses and trouser pockets.

U.S. Pat. No. 7,203,524 describes one method for notifying a user of a call by providing a radio frequency signal to a charm which provides a visual alert to the user.

SUMMARY

Technology is presented for generating an advanced notification of an event which occurs on a wireless device such as a cell phone. The notification is indicated by a "smart" charm which can take the form of a bracelet, watch, keychain, ring, or other ornamental device which is separate from the wireless device. The charm in combination with the device generates alerts about events occurring on a wireless device based on rules associating notification types with the originating party and the event type.

One aspect of the technology is an alert device for a wireless communication device. The alert device includes an alert mechanism, a communication channel and a controller. The controller includes one or more instructions causing the controller to perform the steps of: receiving one or more alert instructions or event notifications. If alert instructions are received, the controller determines whether the instruction is executable by the alert device and executes it if the device is capable of doing so. If not, the controller determines whether an alternative instruction to the alert mechanism can be substituted for the received alert instruction. If an event notification is received, the controller determines whether the alert mechanism should be activated in response to each event notification.

Another aspect of the technology involves operating the wireless device to instruct a smart charm to generate an alert. This includes determining alerting capabilities of a smart charm and determining whether one or more user defined alert rules applies to the event and the originating user. After this determination, one or more alert instructions for the smart charm are generated based on the user defined alert rules and the capabilities of the smart charm.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technology presented herein comprises a "smart" charm, such as a bracelet, watch, keychain, ring, or other device separate from a wireless communication device, which can generate event and user preference based alerts about events occurring on a wireless device. Smart charms can range from simple versions which only notify that some activity is occurring on the wireless device, to more complex charms which have advanced identification capabilities.

Figure 1:
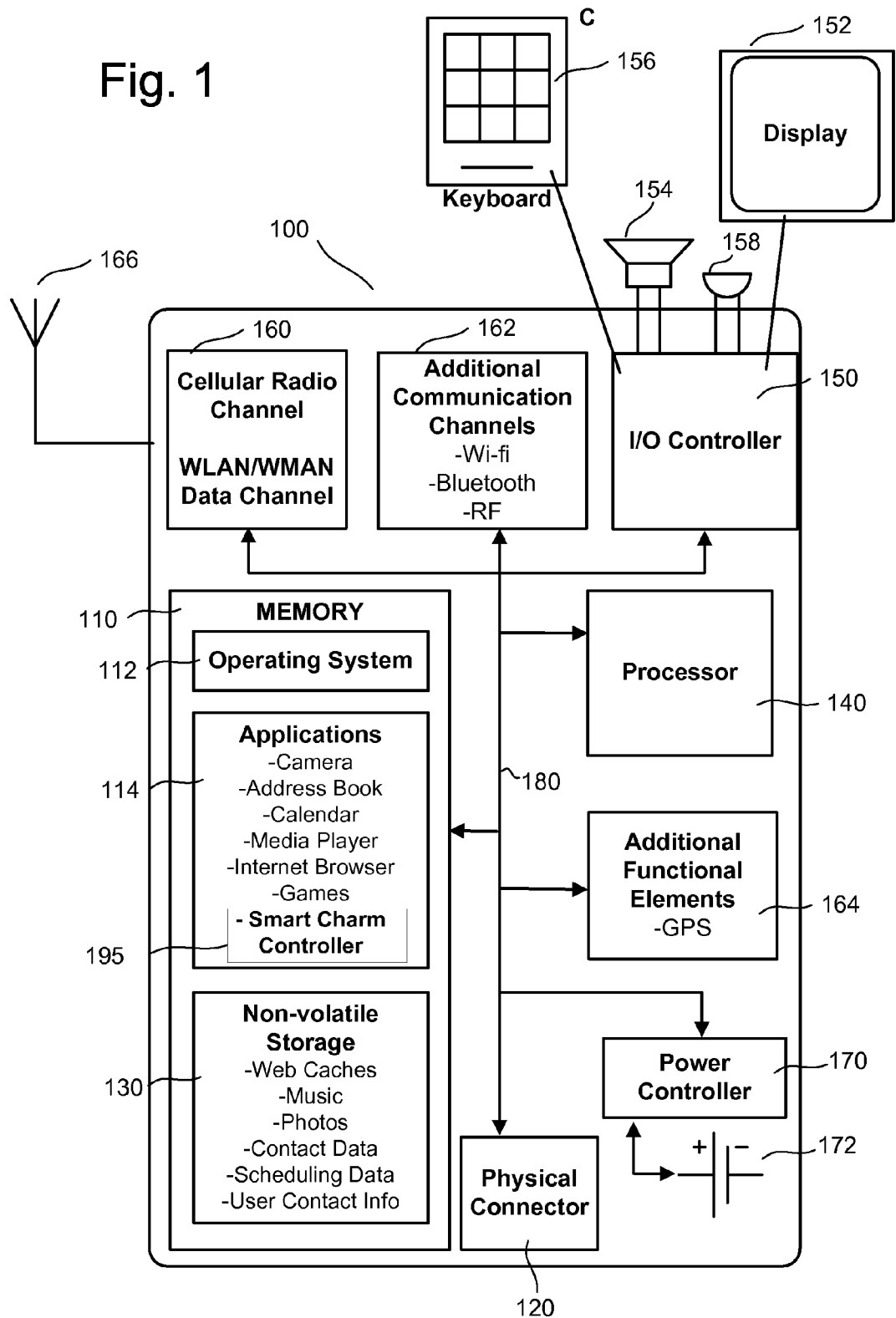
FIG. 1 is a block diagram illustrating the components of a wireless device suitable for use with the present technology.

FIG. 1 is an example of a wireless communication device suitable for use in accordance with the present technology. FIG. 1 depicts an example of typical architecture for a mobile communication device. The device 100 has memory 110, a physical connector 120, processor 140, an input/output (I/O) controller 150, a cellular radio channel and WLAN/WMAN data channel 160, and power controller 170. Each of these components is connected through the system bus 180 of the cell phone 100.

Memory 110 includes the device's operating system 112, applications 114, and non-volatile storage 130. Memory 110 can be any variety of memory storage media types, including non-volatile and volatile memory. The operating system 112 handles the different operations of the device 100 and may contain user interfaces for operations, such as placing and receiving phone calls, text messaging, checking voicemail, and the like. The applications 114 can be any assortment of programs, such as a camera application for photos and/or videos, an address book application, a calendar application, a media player, an internet browser, games, an alarm application, other third party applications, and the like. The non-volatile storage component 130 in memory 110 contains data such as web caches, music, photos, contact data, scheduling data, and other files.

The operating system 112 manages the hardware of the device 100, including hardware such as the display 152, speaker 154, keyboard 156, and camera 158. The operating system 112 also manages software (i.e. applications 114) on the device 100 for performing tasks requested by the user and handling incoming data, for example. This occurs through the operating system's control and allocation memory (i.e. RAM), system tasks, system resources, files systems, and the like. The processor 140 executes operations for the device according to this control and allocation. For example, a user may attempt to open a video file through a media player application using the keyboard 156 on the device 100. In this case, the operating system 112 may direct the processor 140 to open the desired file stored in the non-volatile storage component 130. During this process, the operating system 112 may also direct the processor 140 to control the operation of other applications concurrently in use, such as an application for receiving calls. Once the file is accessed, the operating system 112 may direct the processor 140 to control the input and output devices using the I/O controller 150 to play the sounds on speaker 154 and images on display 152 for the video file.

The power controller 170 of the device 100 allocates power from the device's power supply 172 to the circuitry for different device components used to operate the cell phone 100 and its different features.

Additionally, the physical connector 120 can be used to connect the device 100 to an external power source, such as an AC adapter or powered docking station. Such a connection can be used to charge the device's power supply 172 via the power controller 170. The physical connector 120 can also be used as a data connection to a computing device. The data connection allows for operations such as synchronizing device data with the computing data on another device.

The device 100 also contains a cellular radio channel and WLAN/WMAN data channel 160 for receiving and transmitting data, such as phone calls, text messages, email, webpage data, and the like. Cellular radio communication can occur through any of the standard network protocols of device communication (i.e. GSM, PCS, D-AMPS, UMTS, and the like). The device 100 may also contain additional communication channels 162, such as Wi-fi, Bluetooth, and RF the like, for receiving and transmitting data as well. The device 100 may have additional functional elements for communication 164, such as GPS. Each of the described communication mediums is accessed via the antenna 166 on the device 100. The communication mediums for operations of the device 100 are not limited to the mediums described and can include any other communication mediums known in the art.

Also shown in the application store 114 is a smart charm controller application 195. Smart charm controller application 195 includes a series of instructions directing the processor 140 to perform the methods disclosed herein to direct instructions to a smart charm in accordance with the present technology.

Figure 2:
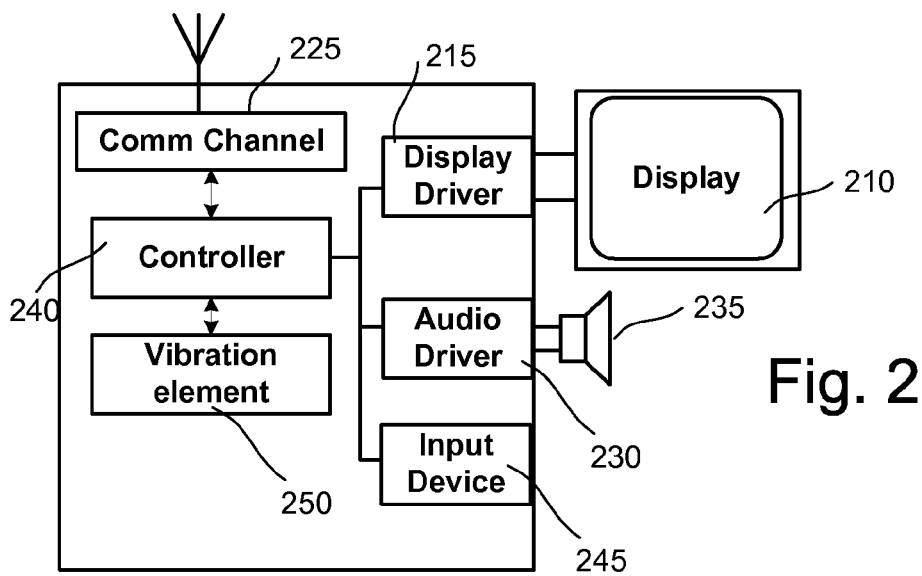
FIG. 2 is a block diagram illustrating the components of a "smart charm" suitable for use in accordance with the present technology.

FIG. 2 is a block diagram illustrating functional components which may be incorporated into a smart charm 200. It should be understood that some smart charms may not include all of the components disclosed in FIG. 2, but may include a subset of these components. A smart charm device 200 may incorporate, for example, a display 210 which is controlled by a display driver 215. It will be understood that display 210 may be a small video display suitable for displaying moving images, still images, text, and graphics, or may be as simple as a single light emitting diode capable of being caused to emit a single or multiple colors. Various types of displays are considered within the depiction of display 210 including multiple diodes, monochrome and color LCD displays and equivalents, and fabric displays. Also included are a speaker 235 and an audio driver 230. It will be understood that the audio driver 230 may be capable of rendering more complex audio, such as encoded audio files or streams of music, spoken words, or other complex audio, or may simply have the capability of generating one or more monophonic or polyphonic tones to indicate an audible alert. A vibration element 250 causes the charm 200 to vibrate under the direction of controller 240. Controller 240 receives instructions via communications channel 230 from one or more wireless communications devices such as those detailed in FIG. 1. In addition, an input device 245 may be provided. The input device may be as simple as a button or multiple buttons which control feedback functions from the charm to the communications device.

The components of charm 200 may be included in an ornamental article or fashion accessory such as a pendant, a ring, a watch, a bracelet, a toy, a keychain, a necklace, a pin, a phone charm, a display enabled fabric or the like.

At least three operational modes for the smart charm 200 are provided. In one embodiment, a complete set of "alert" instructions will be broadcast by the wireless device and the smart charm controller 240 will determine whether or not the smart charm is capable of executing the instructions, and/or whether an alternative is available. In another embodiment, the wireless communication device will broadcast an event notice, and the controller 240 will implement an alert. In a third alternative, instructions specific to the charm are broadcast for the charm and controller 240 executes the instructions on device 200.

Figure 3:
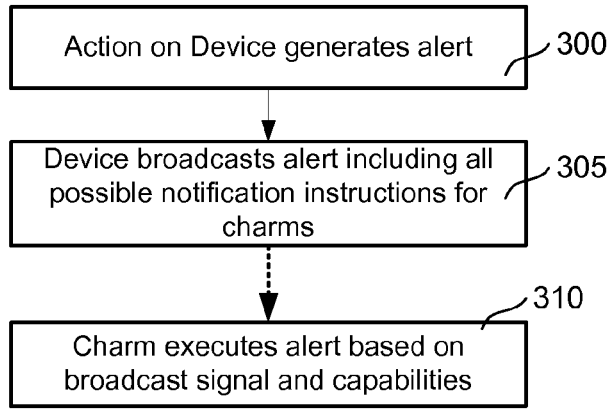
FIG. 3 is an embodiment of a first operational method performed by the devices in accordance with the present technology.
Figure 4:
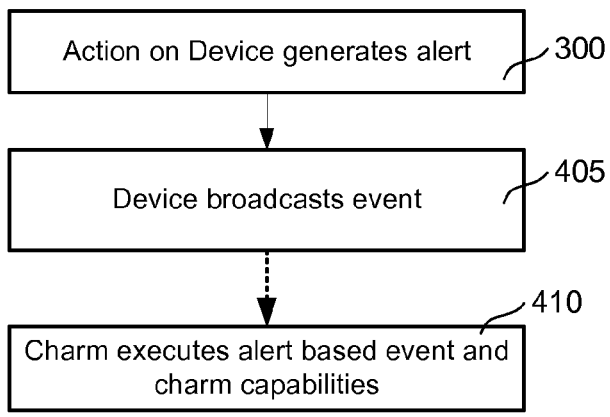
FIG. 4 is a method illustrating a second operational embodiment of the technology.
Figure 5:
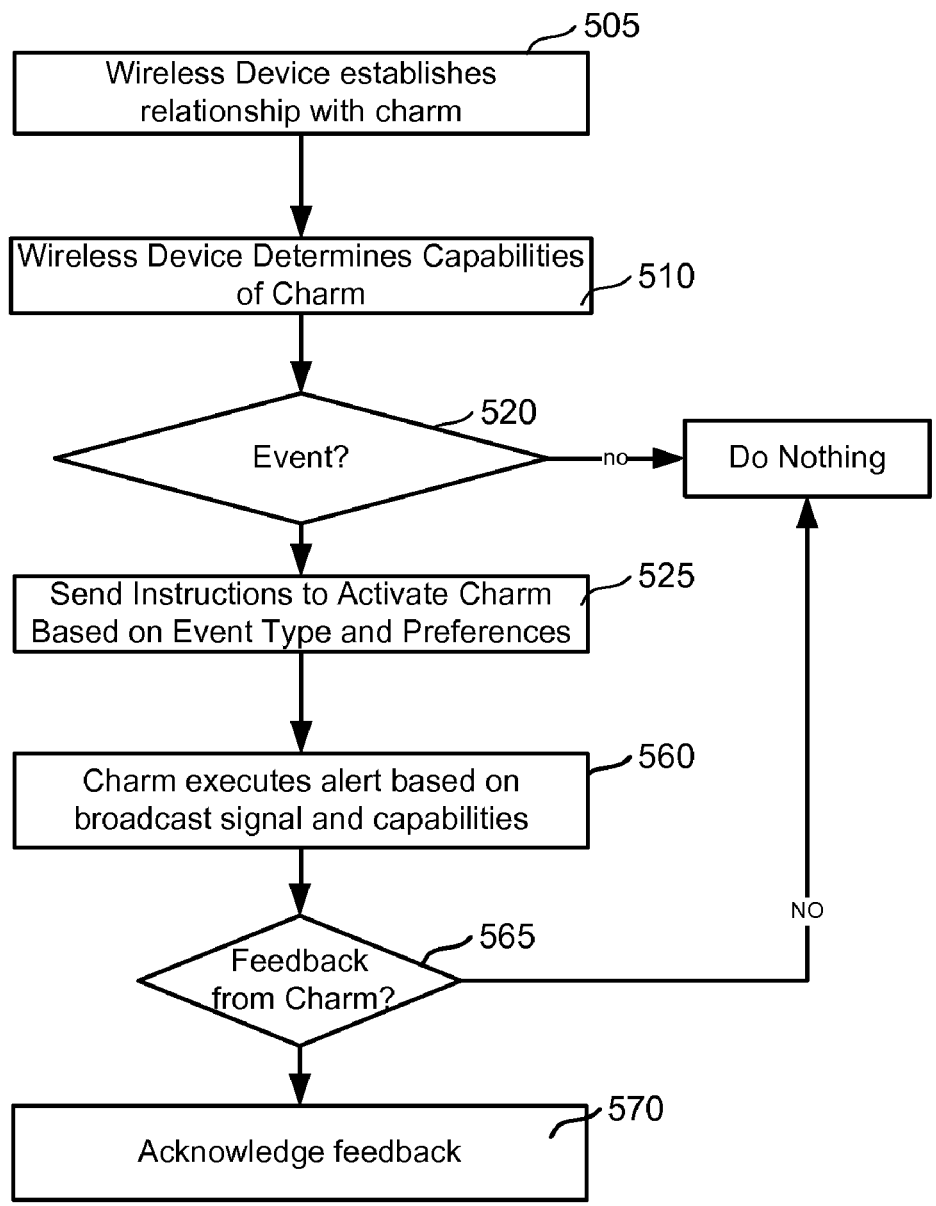
FIG. 5 is a flow chart illustrating a third operational embodiment of the technology.

FIGS. 3, 4 and 5 illustrate the three different operation modes in accordance with the technology.

In FIG. 3, a wireless communications device broadcasts instructions to smart charms that may be within range of the broadcasting wireless device. The smart charms may have been "paired" with the wireless device, such that only the paired individual charm can act on signals generated by the phone. Pairing is a well known technique whereby devices are identified and encoded or encrypted communications between the devices can occur. A typical example is the Bluetooth transport specification developed and licensed by the Bluetooth Special Interest Group. Alternatively, signals may be simply broadcast by the phone with no specific smart charm paired therewith.

Figure 8:
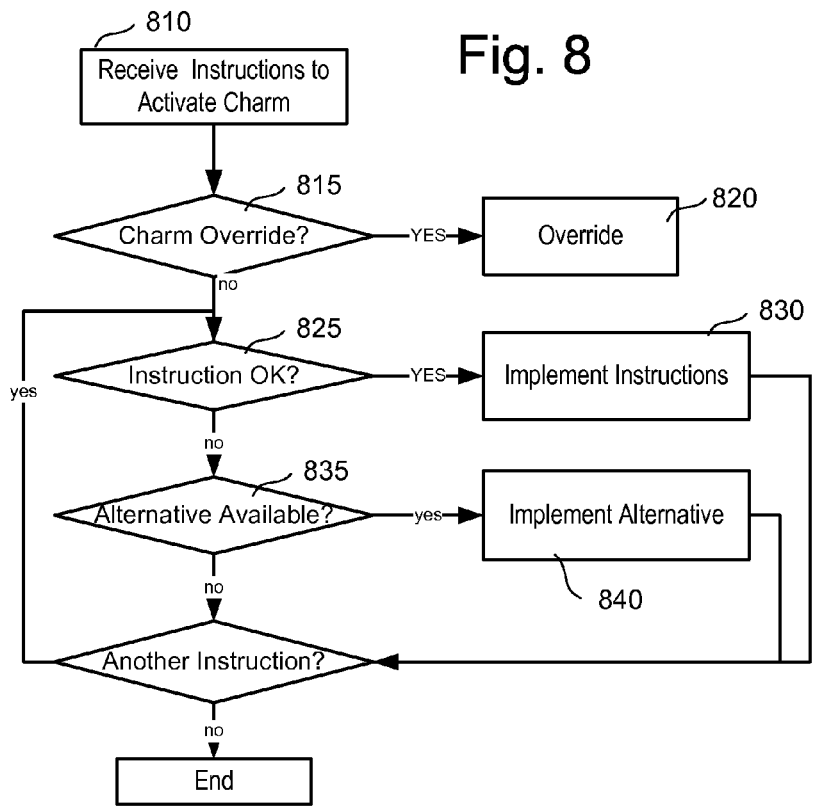
FIG. 8 is a flow chart illustrating a method performed by a smart charm when it receives a set of instructions in accordance with the method of FIG. 3.

In FIG. 3, at step 300, some event or action on the phone will generate a need for an alert. This action may be classified as an "event" with events including, for example, a phone call, an SMS text, an email, a proximity event, or any other action which requires a notification to the phone's operator. A proximity event can be classified as an event which occurs when a social networking service, interacting with GPS units of wireless devices, seeks to notify a wireless device operator that one of the wireless device operator's contacts also with a GPS unit is within a particular proximity of the wireless device operator. Such proximity events, as explained below, can have rules associated with them. At step 305, the device will broadcast an alert instruction or set of instructions including all possible notification instructions for all charms. The set may include items such as: flash the display, play an audible alert, play an encoded music file (including file data), display an image (including image data) and any of a number of other possible instructions to render media or display data. At step 305, the alert for a phone call would include, for example, caller identification information, the name of the caller, the telephone number of the caller, a picture of the caller if one is stored in the phone, an instruction to generate a unique notification if the caller is a close associate of the wireless device operator, or any other number of other special instructions to activate components of the smart charm 200. At step 310, a paired or unpaired smart charm within range would then execute those instructions which it is capable of executing. In this instance, the wireless device has no knowledge of the type of charm or the capabilities of the charm, but simply broadcasts all available notifications via its charm interface. The steps performed by the controller 240 at step 310 when such instructions are received are illustrated in FIG. 8.

In a second embodiment of the technology, illustrated with respect to FIG. 4, the broadcasts an indication of the event, to a paired or unpaired device charm within range, and the charm controller decides how to implement the event as an alert on the charm.

Figure 9:
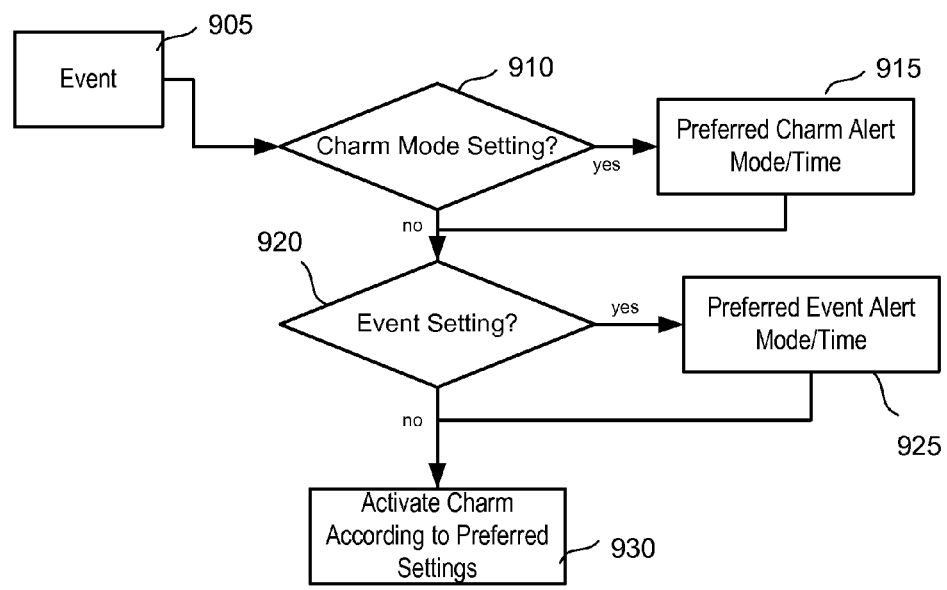
FIG. 9 is a flow chart illustrating a method performed by a smart charm when it receives an event instruction in accordance with the method of FIG. 4.

In FIG. 4, at step 400, an action on the wireless device generates the need for an alert. At step 405, the event causes the wireless device to broadcast a notification of the event to all available smart charms, or to specific smart charms which have been paired with the wireless device. At step 410, the charm itself decides how to act on the event and provide a notification to the user in accordance with the capabilities of the charm. The steps performed by the controller 240 at step 410 when such event notifications are received are illustrated in FIG. 9.

In a third operational embodiment, illustrated with respect to FIG. 5, the wireless device is aware of a particular charm, and the charm's alert capabilities, and sends instructions to the charm in accordance the charm's capabilities and, optionally, one or more user preferences. In FIG. 5, at step 505, the wireless device establishes a relationship with the charm. As discussed above, this may occur using any of a number of available transport mechanisms, including an RF transport mechanism with encoded or encrypted communications, a Bluetooth mechanism or wireless USB. At step 510, the device determines the capabilities of the charm. In step 510, the charm is identified and paired with the wireless device, and the wireless device is capable of generating instructions to the charm in accordance with the charm's actual device capabilities. That is, if the charm is incapable of rendering an image, the wireless device will not forward an image render instruction nor image data to the charm. Likewise, if the charm is incapable of rendering audio, the wireless device will not send instructions to render audio to the device. At step 520, an event occurs and at step 525, the type of event and user preferences for notification of the event are determined. Consequently, at step 530, instructions are sent to the charm to activate an alert based on type user preferences and event type. As such, when a call event occurs, the wireless device will send instructions specific to alert the user that a calling event has occurred. Similar instructions may be generated for a proximity event, text event, or any other event. As a result of the instructions, the charm executes the alert instructions based on the charm's capabilities at step 530. Optionally, as shown at steps 565 and 570, a charm may include the capability to provide feedback to the device. If the charm includes input devices 245, when an alert is generated on the charm, the user may provide feedback at step 565 in response to the alert. The feedback may be as simple as an acknowledgment that the alert was received or may be more complex, such as a simple response to a text message or input control for the communications device. If feedback is received from the charm, the communications device acknowledges the feedback at step 270. It will be understood that the acknowledgement may be as advanced as executing an instruction on the communications device to perform a function on the device, such as initiate a voice call or return a text message.

Figure 10:
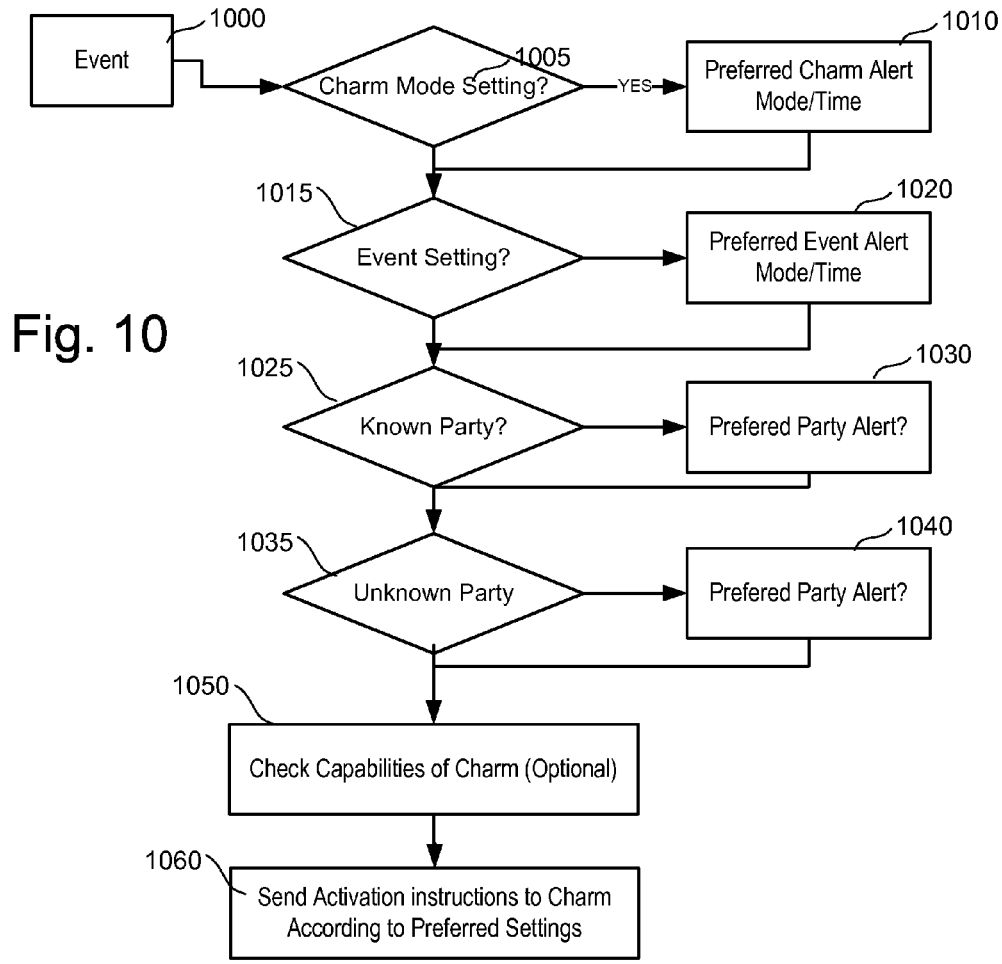
FIG. 10 is a method performed by a wireless device when it receives an event to generate instructions to a smart charm in accordance with the method of FIG. 5.

The steps performed by the wireless device in sending instructions to the charm are illustrated in FIG. 10.

Figure 6:
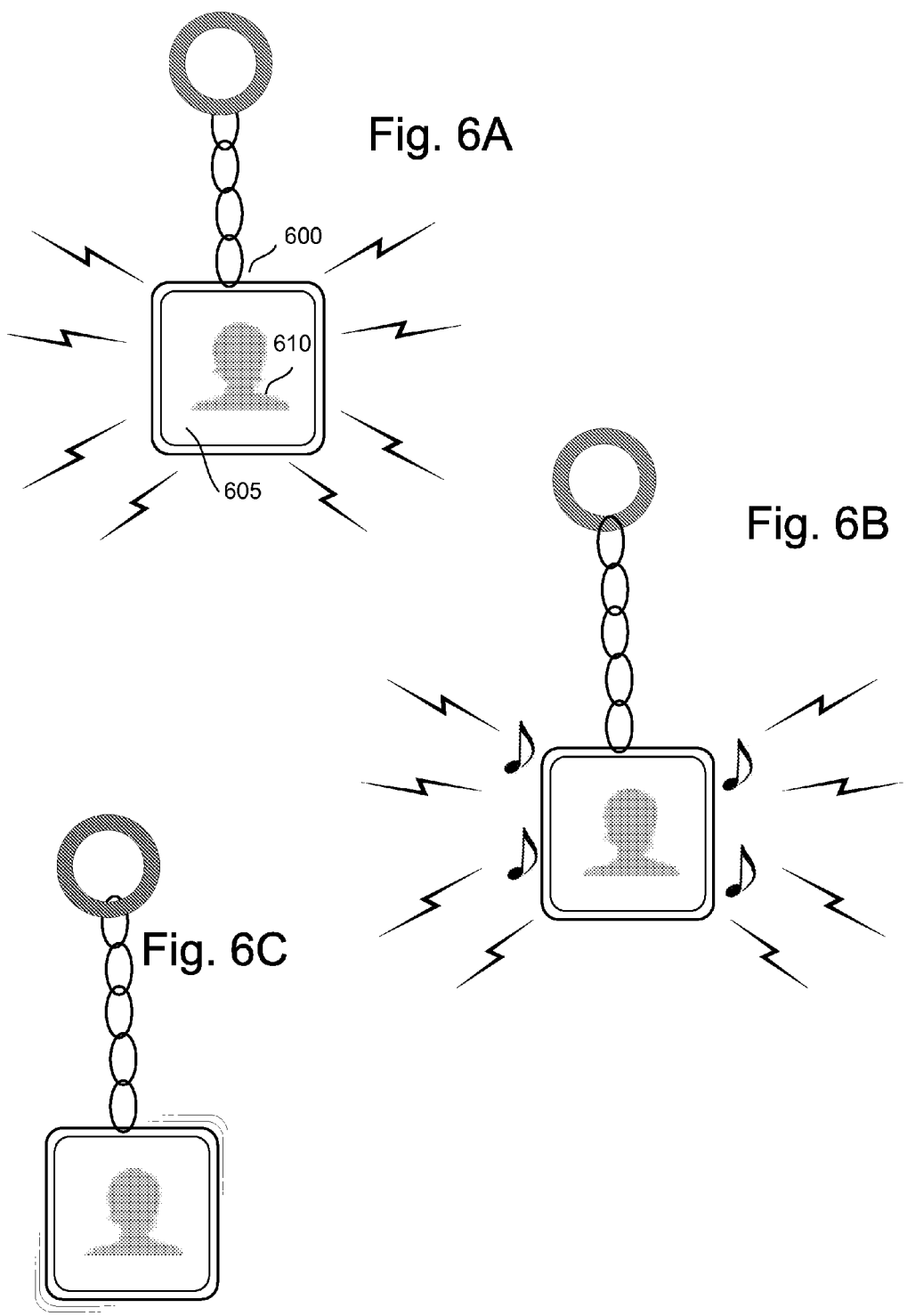
FIGS. 6A-6C illustrate a first type of smart charm having a first type of device capabilities and alerts capable of being generated by the smart charm.

FIGS. 6A-6C illustrate one example of the type of alerts which may be sent to a first exemplary smart charm 600. In FIGS. 6A-6C, the smart charm is a keychain with a graphics enabled display 605 capable of generating an image 610 and audio, as well as including a vibration mode. In the Examples shown in FIGS. 6A-6C, a phone call event is received on the wireless device. As shown in FIG. 6A, the instructions generated at step 525 may cause the image 610 of the caller to be displayed and the device to flash repeatedly for some interval of time to indicate that a call has been received at step 520. In another alternative, illustrated in FIG. 6B, h the image may be displayed, and music or an audible alert may be played from the charm as well. The music may comprise announcement of the name of the caller or a special ringtone associated with the caller. Optionally, if the caller is not a recognized caller, a general ringtone and general image may be displayed. In FIG. 6C, a vibration mode may be activated as an alternative or in conjunction with the audible alert, the image display and/or the flashing of the display. The image displayed in all three embodiments may be that of a specific user or a general user icon.

Figure 7:
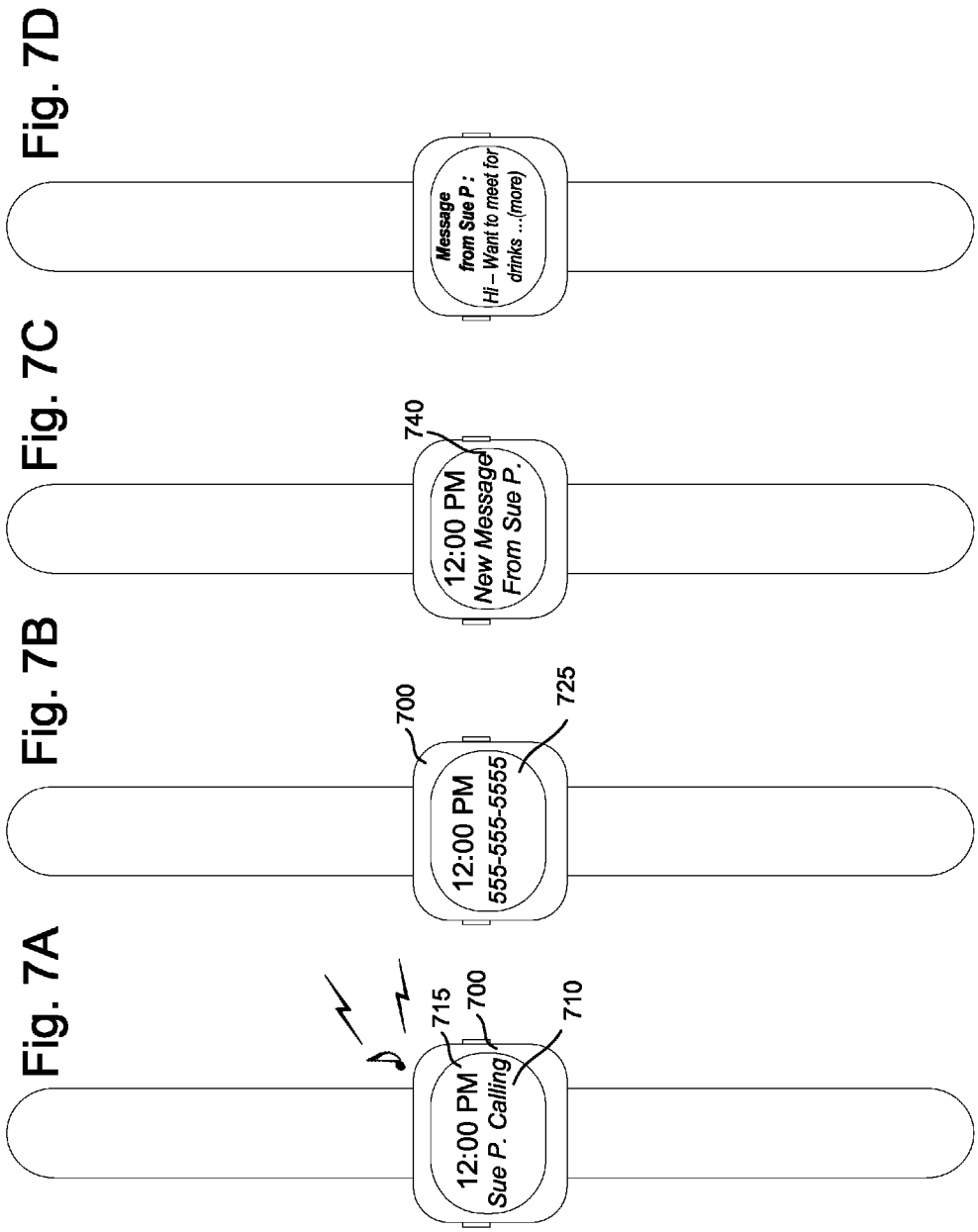
FIGS. 7A-7D illustrate a second type of smart device and alerts capable of being generated by the smart charm illustrated therein.

Alternative call event notifications are shown in FIGS. 7A and 7B. In FIGS. 7A-7D, the smart charm is a watch 700 with a text capable display 715. In the examples of FIGS. 7A-7D, the watch is not capable of displaying images or sound other than a monotone beep. In FIG. 7A, a caller name may be displayed by indicating a message 710 on the face 715 of watch 700. An audible alert may also be generated to indicate that "Sue P." is calling. FIG. 7B illustrates a second alternative whereby a phone number 725 is displayed on the watch device 700. Again, an audible or flashing display may be coupled with the message on the display.

Returning to FIG. 5, if the event is a text event 530, specific instructions to activate the charm in accordance a text message may be provided. FIGS. 7C and 7D show alerts generated when a text event occurs. IN FIG. 7c, for example, a message indicator that "Sue P. has sent a new message" 740 may be displayed, or alternatively actual portions of the message may be displayed as shown in FIG. 7D.

FIG. 8 illustrates the process occurring on smart charm 200 when it receives instructions to activate an alert. FIG. 8 illustrates the process which occurs at step 310, above, when a charm receives a number of possible instructions some of which it is capable of executing and others of which it is not capable of executing. At step 810, the smart charm will receive instructions to activate certain components. In this example, the set of instructions will include all possible instructions which can be executed by any of a number of smart charms known to the wireless device. At step 815, the controller will determine whether a charm override has been activated. Certain smart charms, such as those illustrated in FIGS. 6A-7D, may include control elements such as buttons 740 and a user interface which allow the charm to be programmed separate and apart from the wireless device or through the wireless device. One such function which may be included in the smart charm device 200 is a charm override function. This allows a user to disable the charm permanently, manually, or for a specific period of time in case the user does not wish to be notified via the charm. More complex forms of filters may be employed at step 825 if the charm is enabled for separate filtering. For example, the charm may be programmable to activate only at certain times or for certain known users. This may occur, for example, when a user is sleeping or when a user is in a meeting and has a charm capable of producing an audible alert. As such, the user is not required to return to the phone to disable the charm's functionality, although in one embodiment, the smart charm controller application may include an interface for programming the smart charm. If the charm override is enabled, then at step 820, the charm will implement the override instructions and not execute any of the instructions received from the wireless device. At step 825, the charm will access the first instruction and if the instructions can be implemented by the charm at step 825, it will implement them at step 830 and return to check the next instruction received from the wireless device. If the wireless device cannot implement the instruction at step 825, then at step 835 it will check to determine whether an alternative feature can be implemented or substituted for a particular function. For example, if an instruction is provided from a wireless device to play a certain compressed audio ringtone for a particular user, and the ringtone file is transmitted with the instruction (see FIG. 11 below), the device may determine at step 835 that it is incapable of rendering the particular compressed audio, but may instead at step 840 generate an audible beep or number of beeps to indicate that a ringtone was desired. If no alternative is available or if the alternative is implemented, the next instruction is checked until no further instructions are checked at step 845.

FIG. 9 illustrates a method implemented by a charm in accordance with the step 410 above where the charm makes decisions for implementing where it is based on the notification of an event by the wireless device. As indicated at step 410, in FIG. 9 at step 905 when an event is received by the charm, the charm first checks to see whether a particular charm mode setting is enabled. The charm mode setting is similar to step 815 above and if a particular preference is specified by the user, at step 915, the preference will be noted and recorded. At step 920, an event setting for the charm will be checked. The event setting may be a particular rule or a manner in which a particular event is indicated by the charm. For example, and in most basic terms, where a simple LED is provided on a charm, the LED may be instructed to glow green for a phone call, red for an SMS message, and yellow for an email message, or differently based on the person associated with the event. If the preferred alert mode is set, and available at step 925, then at step 930, the charm would be activated according to the preferred settings. It will be noted that at step 930, the preferred settings of the charm mode and the event may be in conflict. For example, if the charm mode indicates that a user is not to be disturbed between the hours of 12:00 and 1:00 p.m., but the charm mode setting indicates that the user wishes to receive an audible alert when the user's spouse calls, one of the two rules must be given priority in order to activate or not activate the charm at step 930. It will be understood that the priority of the charm mode setting and the event setting may be left to the user, or may be something which is determined in a default setting in the charm itself.

Figure 12:
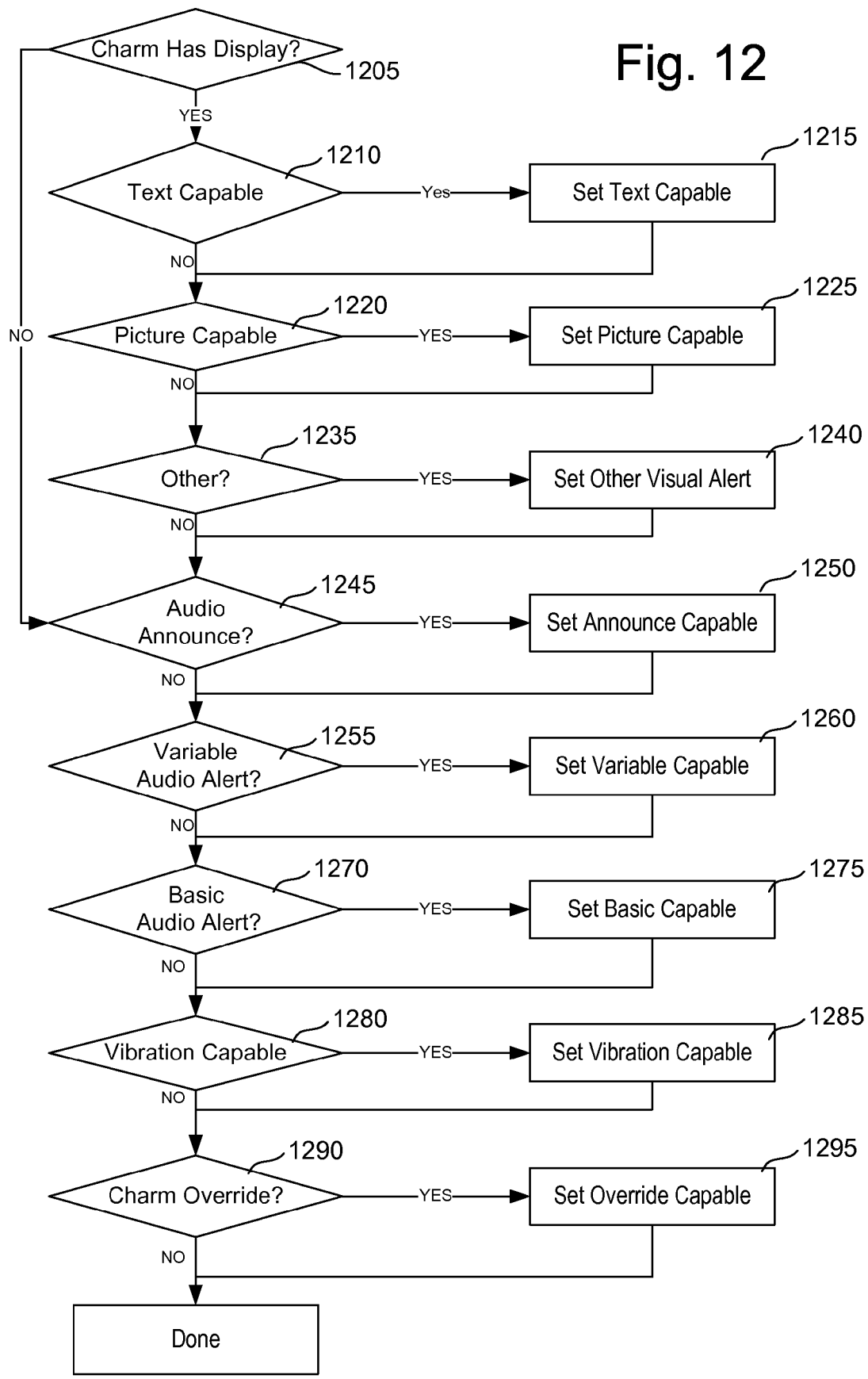
FIG. 12 illustrates a method used by the wireless device in accordance with the present technology for determining the capabilities of a smart device charm.

FIG. 10 illustrates the steps performed at any of step 525 when one or more events 1000 is received by the phone. In accordance with FIG. 5, the phone will be generating specific instructions to the charm, the capabilities of which are known to the phone. FIG. 12, discussed below, illustrates the manner in which the wireless device determines whether or not a particular smart charm is capable of performing certain functions.

When an event 1000 is received by the wireless device, initially at step 1005, the device determines whether a charm mode setting is present in the phone. For example, the charm mode setting is similar to the charm mode setting 815 set forth above in FIG. 8. As such, at step 1010, if a preferred charm alert mode or time is set by the user at step 1005, then the preference is noted at step 1010 and an event setting is checked at step 1015. Again, if a particular event (a call, text message, SMS, email, proximity event) has a particular preferred mode of alert, the preferred alert type will be noted at step 1020. The device next checks to determine whether or not the party which initiated the event is a known party at step 1025. At step 1025, the user may set different preferences for those parties which are present in the user's address book, certain categories of users within the address book, or certain individual users (such as "friends") within the address book. If a particular party, group, or category of user has an identified preference, the preferred means of notifying the user based on the party's origin and known status is noted at step 1030. Likewise, if the party is not known to the user at step 1035, the method checks to determine whether or not a preferred party preference 1040 is available. Once the particular settings and hierarchy of the settings is known, optionally, at step 1050, the device may check the capabilities of the charm to determine whether it is possible to generate the preferred types of alerts, or initiate substitutes based on user preferences for the particular preferences identified in steps 1010, 1020, 1030, and 1040. Once the preferential ordering of a notice is determined, at step 1060 the activation instructions are forwarded to the charm in accordance with preferred settings.

Figure 11A:
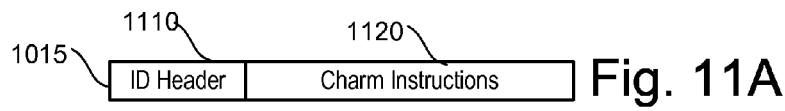
FIGS. 11A-11D illustrate data packet types suitable for use in accordance with the present technology.
Figure 11B:
Figure 11C:
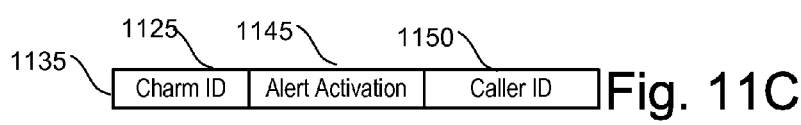
Figure 11D:
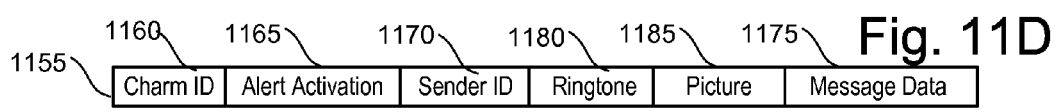

FIGS. 11A-11D illustrate various data packet formats for sending instructions to the smart charm. In the method illustrated with respect to FIG. 2, where the smart charm is an unknown smart charm and the device is simply broadcasting to unpaired devices, the information packet 1105 shown in FIG. 11A may include an ID header, indicating to the smart charm controller that the packet 1105 is in fact a set of charm instructions, and actual charm instructions 1120 which may include one or more activation instructions for the different components of the smart charm. In the method illustrated above with respect to FIG. 4, a exemplary packet 1115 shown in FIG. 9B may include an individual charm ID, specifically identifying the charm for which it is intended, and an event identification 1130 indicating the type of event which is being broadcast by the wireless device. The charm ID may include handshaking or other control information to allow communication to occur between the charm and the wireless device. Alternatively, packet 1115 may simply include a ID header 1110 (similar to that used in packet 1105) and the event ID 1130. Another alternative is illustrated in FIG. 11C where the packet 1135 includes a charm ID 1125, a specific alert activation instruction 1145, and called identification information 1150. The caller ID information may comprise a number or other caller identification information such as a name or nickname present in the wireless device address book application. In another alternative as illustrated in FIG. 11D, the packet 1155 includes a charm ID 1160, alert activation instruction 1165, sender ID 1170, message data 1175, ringtone data 1180, and picture data 1185. The ringtone data may be provided in any number of compressed or uncompressed media formats. Similarly, the picture data may include any number of compressed or uncompressed image data formats.

As noted above, in the third operational embodiment, the wireless device requires knowledge of the capabilities of the smart charm. Such knowledge can be acquired by any of a number of means. In one embodiment, each smart charm may include an identification code. Upon a query for the code, the wireless device can determine the device capabilities by checking database stored in the nonvolatile data of the wireless device for the particular type of smart charm and the charm's capabilities.

FIG. 12 illustrates a method by which the wireless device can determine the capabilities of a particular smart charm by querying the capabilities of the charm. The wireless device can query the smart charm to determine whether the charm has display 1205, and if so whether the display is text capable 1210. If the display is text capable, the device sets text capable variable 1215. Likewise the wireless device checks: whether the display is picture capable 1220 and if so, sets a picture capable variable 1225; whether other capabilities are present at 1235, and if so sets another visual alert capabilities variable 1240. Likewise, a determination may be made whether or not the device is capable of rendering an audio announcement at step 1245, and if so an audio announcement variable is set at step 1250. If an audio announcement is not capable of being rendered, then a determination is made at step 1255 whether a variable audio alert may be set and if so, the device records that a variable audio alert may be generated at step 1260. Likewise, determinations are made as to whether a basic audio alert is possible at step 1270, whether the device is vibration capable at step 1280, and whether a charm override mode is possible at step 1290. Corresponding capabilities are recorded at steps 1265, 1275, 1285 and 1295.

It will be recognized that numerous variations on the above operational methods of the technology may be implemented. For example, in one variation of the method of FIGS. 3 and 4, additional control over notifications of instructions (step 305) or event notifications (Step 405) can be controlled by the wireless device. That is, event or known user rules may control the type of instructions sent or whether an event notification is sent at all. In this manner, greater control over the smart charm is enacted at the wireless device level before any action takes place on the smart charm. In an additional embodiment, it will be recognized that multiple charms may be paired with one device or multiple devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An alert device for a wireless communication device, the alert device being separate from the wireless communication device, the alert device, comprising:
    an alert mechanism having one or more alert capabilities;
    a communication channel, coupling the alert device to the wireless communication device;
    a controller coupled to the alert mechanism, the controller including one or more instructions causing the controller to perform the steps of:
    (a) receiving one or more alert instructions to activate the alert mechanism;
    (b) determining whether the one or more alert instructions is executable by the alert device by activating the one or more alert capabilities;
    (c) if the received alert instruction can be executed by the alert mechanism, activating the one or more alert capabilities of the alert mechanism according to the received alert instruction, and if not, determining whether an alternative instruction to the alert mechanism can be substituted for the received alert instruction to activate an alternative one or more alert capabilities.

2. The device of claim 1 wherein the alert mechanism comprises one or more of an audible sound generator, a visual indicator, a visual display and/or a vibration mechanism.

3. The device of claim 1 wherein the step (a) includes receiving a plurality of instructions to activate one or more of an audible sound generator, a visual indicator, a visual display and/or a vibration mechanism.

4. The device of claim 3 wherein the plurality of instructions includes one or more of: an audible file for output by the audible sound generator, message text for display on the visual display, caller information for display on the visual display.

5. The device of claim 3 wherein steps (b) and (c) are repeated for each of the plurality of instructions.

6. The device of claim 1 wherein said step (b) includes determining whether a charm alert override is enabled preventing execution of the alert.

7. The device of claim 1 wherein said step (c) further includes the step of activating the alternative instruction.

8. A processor implemented method performed by a wireless device to instruct a smart charm comprising an ornamental article separate from the wireless communication device to generate an alert, comprising:
    establishing communication with a smart charm;
    determining alerting capabilities of the smart charm;
    receiving user-defined alert rules defining a relationship between an alert event and the alerting capabilities of the smart charm;
    receiving an event on the wireless device from an originating user;
    determining whether one or more of the user defined alert rules apply to the event and the originating user;
    generating one or more alert instructions for the smart charm based on the user defined alert rules and the alerting capabilities of the smart charm, and outputting the one or more alert instructions to the smart charm.

9. The method of claim 8 wherein the step of determining includes querying the smart charm to determine whether the charm includes one or more of an audible sound generator, a visual indicator, a visual display and/or a vibration mechanism.

10. The method of claim 8 wherein the step of receiving includes receiving an event comprising one of an event type comprising a voice communication, a text message, an email message, an originating user proximity indication or an alarm.

11. The method of claim 8 wherein the step of determining further includes determining whether one or more alert preferences is associated with the event type.

12. The method of claim 8 wherein the one or more alert instructions includes one or more of: an audible file for output by an audible sound generator, message text for display on a visual display, caller information for display on the visual display.

13. The method of claim 8 wherein the one or more alert instructions include one or more of: an audible file for output by an audible sound generator, message text for display on a visual display, caller information for display on the visual display, a ringtone file, an image file.

14. The method of claim 8 wherein said method further includes: pairing the wireless device and the smart charm, and forwarding the alert instructions to the paired smart charm.

15. The method of claim 8 wherein the step of determining the one or more user defined alert rules includes determining whether the originating party is one of a known user, an unknown user, a user identified on the wireless device as a friend, or a user identified on the wireless device as belonging to a group, and further includes determining whether one or more alert preferences is associate with the user as identified.

16. An alert device for a wireless communication device, the alert device comprising an ornamental article separate from the wireless communication device, comprising:

an alert mechanism comprising one or more of an audible sound generator, a visual indicator, a visual display and/or a vibration mechanism;

a communication channel;

a controller coupled to the alert mechanism, the controller including one or more instructions causing the controller to perform the steps of:

(a) receiving event notifications from the wireless communication device comprising an event of a voice communication, a text message, an email message, an originating user proximity indication or an alarm;

(b) determining whether the alert mechanism should be activated in response to each event notification, including determining whether a charm alert override is enabled preventing execution of the alert;

(c) if a received alert mechanism should be activated, activating the alert mechanism according to capabilities of the wireless communication device.

17. The device of claim 16 wherein said step (b) includes determining whether one or more alert preferences is associated with the event type.

* * * * *